CHARLES CLARK, OF DAYTON, KENTUCKY.

Letters Patent No. 85,642, dated January 5, 1869.

---

IMPROVED LUBRICATING-COMPOUND FOR USE IN THE MANUFACTURE OF FIBROUS MATERIALS.

---

The Schedule referred to in these Letters Patent and making part of the same.

---

*To all whom it may concern:*

Be it known that I, CHARLES CLARK, of Dayton, in the county of Campbell, and State of Kentucky, have invented a new and valuable Improvement in a Composition, as a substitute for oil, to be Used in Manufacturing Fibrous Substances; and I do hereby declare that the following is a full, clear, and exact description of the ingredients, and mode of preparation thereof.

The nature of my invention consists in providing a substitute for oil in the manufacture of fibrous substances in which oil has heretofore been used.

To this end, I take, of condensed or distilled water, one hundred and twenty pounds, and add thereto one hundred and ten pounds of china-clay.

These ingredients I mix together in a suitable vessel, until the clay becomes soft. I then admit a current of steam into the vessel, near the bottom thereof, of sufficient volume to boil the mixture.

When this is done, I add fifty-five pounds of common lard, and after the lard is thoroughly melted, I add one pound of potash, dissolved in three gallons of condensed water, and four pounds of borax, and twelve pounds of salt—the salt and borax also dissolved in said three gallons of water, or they may be added to the composition after the same has been thoroughly mixed.

I prefer to keep the contents of the vessel in motion by stirring while the afore-mentioned process is being carried on.

A composition formed according to the foregoing formula, when used for the purposes mentioned, softens, toughens, and whitens the fibres of the cloth, and gives to it a soft, smooth surface. It serves the purpose for which oil has heretofore been used far better than the oil itself, and at the same time costs the manufacturer fully sixty per cent. less.

What I claim as my invention, and desire to secure by Letters Patent, is—

A composition, to be used in the manufacture of fibrous substances, as a substitute for oil, compounded of the ingredients and in the manner substantially as herein specified.

In testimony that I claim the above, I have hereunto subscribed my name, in the presence of two witnesses.

CHAS. CLARK.

Witnesses:
H. P. BRAZEE, Jr.,
H. H. JENKS.